United States Patent
Freeman et al.

(10) Patent No.: US 8,017,050 B2
(45) Date of Patent: Sep. 13, 2011

(54) WATER PURIFICATION MEMBRANES WITH IMPROVED FOULING RESISTANCE

(75) Inventors: Benny D. Freeman, Austin, TX (US); Ho Bum Park, Austin, TX (US); Bryan D. McCloskey, Austin, TX (US)

(73) Assignee: Board of Regents The University of Texas System, Austin, TX (US)

( * ) Notice: Subject to any disclaimer, the term of this patent is extended or adjusted under 35 U.S.C. 154(b) by 91 days.

(21) Appl. No.: 12/500,514

(22) Filed: Jul. 9, 2009

(65) Prior Publication Data

US 2010/0051538 A1 Mar. 4, 2010

Related U.S. Application Data

(60) Provisional application No. 61/079,608, filed on Jul. 10, 2008.

(51) Int. Cl.
*B01D 67/00* (2006.01)
*B01D 39/00* (2006.01)
*B01D 29/00* (2006.01)
*B01D 63/00* (2006.01)

(52) U.S. Cl. ............ 264/48; 210/490; 210/500.27; 210/500.37; 210/500.36; 210/500.41; 210/257.2

(58) Field of Classification Search ............. 210/500.27, 210/500.38, 490, 500.36, 500.41, 500.43, 210/500.7, 257.2; 428/305.5; 422/101–104; 264/48–49

See application file for complete search history.

(56) References Cited

U.S. PATENT DOCUMENTS

| 4,767,645 | A | * | 8/1988 | Linder et al. ............ 427/386 |
| 4,833,014 | A | * | 5/1989 | Linder et al. ............ 428/308.4 |
| 5,019,261 | A |   | 5/1991 | Stengaard |
| 5,091,086 | A | * | 2/1992 | Stengaard ............ 210/490 |
| 6,177,011 | B1 |  | 1/2001 | Hachisuka et al. |
| 7,094,349 | B2 | * | 8/2006 | Inoue et al. ............ 210/500.27 |
| 7,537,697 | B2 | * | 5/2009 | Koo et al. ............ 210/500.38 |
| 2007/0175821 | A1 |  | 8/2007 | Koo et al. |
| 2008/0149566 | A1 |  | 6/2008 | Messersmith et al. |

FOREIGN PATENT DOCUMENTS

EP    0 242 761 A2    10/1987

OTHER PUBLICATIONS

International Search Report and Written Opinion for PCT/US2009/050150 dated Feb. 19, 2010.
Xi, Z. Y., et al., "A facile method of surface modification for hydrophobic polymer membranes based on the adhesive behavior of poly(DOPA) and poly(dopamine)," Journal of Membrane Science (2009), 327:244-253.
International Search Report and Written opinion for PCT/US2009/050105 dated Apr. 6, 2010.

(Continued)

*Primary Examiner* — Ana Fortuna
(74) *Attorney, Agent, or Firm* — Chainey P. Singleton; Chalker Flores, LLP

(57) ABSTRACT

The present invention includes methods and compositions for liquid separation and water purification. The present invention includes a purification membrane having a polymer matrix purification membrane that has been treated with dopamine to form a polydopamine coated membrane with a high water flux and a high hydrophilicity.

16 Claims, 6 Drawing Sheets

OTHER PUBLICATIONS

Li, B., et al., "Ultrathin and Stable Active Layer of Dense Composite Membrane Enabled by Poly(dopamine)," Langmuir Article, Apr. 14, 2009, vol. 25, Issue 13, pp. 7368-7374.

Yin, X. B., et al., "Polydopamine-based permanent coating capillary electrochromatography for auxin determination," Journal of Chromatography A, Oct. 7, 2008, vol. 1212, pp. 130-136.

* cited by examiner

WATER PURIFICATION MEMBRANES WITH IMPROVED FOULING RESISTANCE

STATEMENT OF FEDERALLY FUNDED RESEARCH

This invention was made with U.S. Government support under Contract No. CBET-0553957 awarded by the National Science Foundation. The government has certain rights in this invention.

TECHNICAL FIELD OF THE INVENTION

The present invention relates in general to the field of treatment of liquids, in particular for purification of contaminated water using a water purification membrane.

CROSS-REFERENCE TO RELATED APPLICATIONS

This application is a non-provisional of U.S. Provisional Application Ser. No. 61/079,608, filed Jul. 10, 2008, the contents of each of which are incorporated by reference herein in their entireties.

INCORPORATION-BY-REFERENCE OF MATERIALS FILED ON COMPACT DISC

None.

BACKGROUND OF THE INVENTION

Without limiting the scope of the invention, its background is described in connection with methods and apparatuses for the purification using membranes and more specifically, water purification membranes. Water purification membranes are used throughout the world to remove contaminants; however, one of the major drawbacks to their use is membrane fouling. Generally, membrane fouling occurs when impurities in the water are deposited on the membrane surface or the internal pore structure of the membrane. These deposits lead to a dramatic reduction in water flux, which increases operating costs and decreases membrane lifetime. One of the major sources of membrane fouling is organic compounds, which have a high binding affinity for hydrophobic surfaces such as commercial RO, NF and UF membranes. Most studies have focused on reducing fouling by reducing the binding affinity of the components on the surface by increasing membrane hydrophilicity.

SUMMARY OF THE INVENTION

The present inventors recognized that what was needed was a method and composition to reduce foulant adhesion and could be applied to the surface of current commercial RO, NF and UF membranes to form a highly hydrophilic surface. The present inventors recognized that a polydopamine coating applied to the surface of the membrane increased the surface hydrophilicity and lead to a reduction in membrane fouling. This fouling reduction results in higher membrane fluxes when filtering, for example, oil-water emulsions, protein solutions, and natural waters.

The present inventors recognized that many studies have examined grafting or coating hydrophilic molecules to a membrane surface to alleviate membrane fouling. However, the present inventors also recognized that many of these techniques are not applicable to multiple types of water purification membranes and many require commercially unviable treatment steps, such as plasma treatment.

The present inventors recognized that polydopamine deposition increases membrane hydrophilicity while not dramatically reducing the pure water flux of the membrane to make it ideally suited to alleviate fouling when used to modify a water purification membrane surface. The present invention includes a method of decreasing membrane fouling by depositing a polydopamine coating on a membrane to form a polydopamine coated membrane. The polydopamine coated membrane has a high water flux and an increased membrane hydrophilicity, which contributes to the fouling resistance of dopamine-treated membranes.

The present invention includes a liquid separation apparatus having a purification membrane, a polydopamine layer deposited on the purification membrane to form a polydopamine coated membrane, wherein the polydopamine layer increases the hydrophilicity of the purification membrane and the polydopamine coated membrane has a high water flux and one or more containers positioned on different sides of the polydopamine coated membrane to contain the separated liquid.

The present invention also includes a purification membrane having a polymer matrix purification membrane and a polydopamine layer deposited on the purification membrane to form a polydopamine coated membrane with a high water flux and a high hydrophilicity.

The present invention also includes a purification membrane, a polydopamine layer deposited on the purification membrane to form a polydopamine coated membrane, and another polymer layer that can be formed either by grafting to the polydopamine layer or coating onto the polydopamine layer. The polymer layer is used to further enhance the fouling resistance of the purification membrane.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
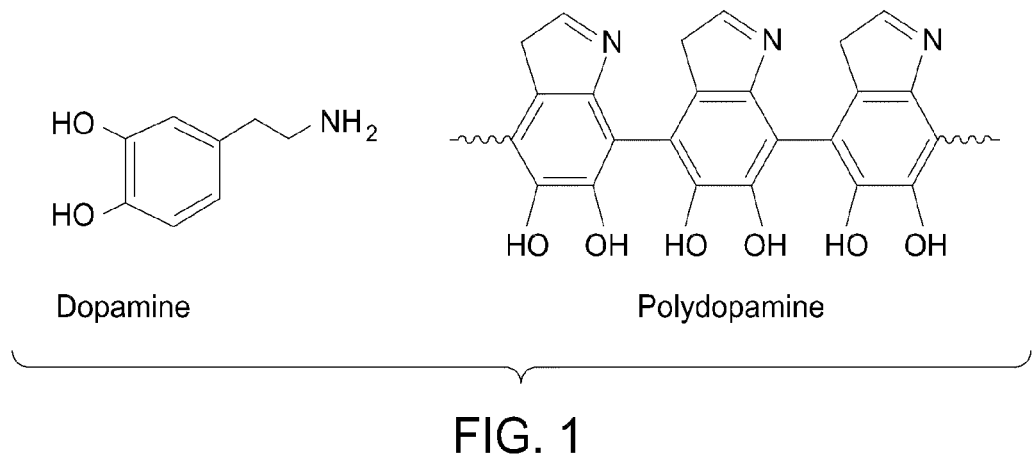
FIG. 1 is a schematic of the structure of dopamine and polydopamine.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used herein the term "molecule" is used to refer to a combination of two or more atoms in a definite arrangement held together by covalent chemical bonds and is generally considered the smallest particle of a pure substance that still retains its composition and chemical properties.

As used herein the term "water flux" or "flux" is used to refer to the volume of solution (e.g., water, clean water etc.) flowing through a given membrane area during a given time. Measurement of the amount of water that flows through a cartridge.

In addition, the individual monomer, copolymers, subunits or polymers may be substituted with one or more molecules, groups or atoms. The number, position, location and type of modification may be varied by the skilled artisan. The modifications may include the addition of one or more of the following groups: lower alkyl, alkenyl, amino, aryl, alkylaryl, halogen, halo, haloalkyl, phosphoryl or combination thereof. The skilled artisan will recognize that modified or substituted dopamine to form a substituted polydopamine on the membrane surface. The substitution may be one or more lower alkyl groups, alkenyl groups, amino groups, aryl groups, alkylaryl groups, halogen groups, halo groups, haloalkyl groups, phosphoryl groups or combination thereof. The substituted polydopamine may have one or more groups and the groups may be similar or different groups.

The present invention includes a deposition method used to treat membranes with dopamine to form polydopamine on the membrane surface and in the case of porous membranes, inside the membrane pores. This method is advantageous over other modifications because of its ease of applicability to virtually any membrane support. Polydopamine nonspecifically adheres to virtually any surface with which it comes into contact. The deposition process occurs by dissolving dopamine in an alkaline water solution (e.g., from a pH of about 8 to a pH of 14) and immersing a membrane into the solution for a certain period of time (e.g., 1 minute to multiple days). The skilled artisan will appreciate that the length of time of exposure of the membrane to the dopamine solution may be varied to change the amount of dopamine (and therefore polydopamine) deposited on the membrane surface. For example, one can use a dopamine solution concentration of 2 mg of dopamine per ml of tris(hydroxymethyl)aminomethane (TRIS) aqueous buffer (pH=8-10). The skilled artisan will appreciate that the dopamine concentration can be varied, as can the buffer solution used and that the dopamine can be applied from an alkaline aqueous solution with no buffer if desired, to vary the amount of dopamine (and therefore polydopamine) deposited onto the membrane.

In addition to being a polydopamine layer deposited onto the membrane or a membrane composition having polydopamine, the present invention includes layers and composition having dopamine/polydopamine as an additive. When the dopamine/polydopamine is in the form of an additive, the actual dopamine/polydopamine concentration will be a percentage of the total concentration and may be from 0.001 to 50 percent. When the percentage of dopamine/polydopamine is above 50 percent, dopamine/polydopamine will be considered the polymer and any additional compositions will be considered as the additive. For example, the dopamine/polydopamine additive concentration may be 0.1, 0.2, 0.3, 0.4, 0.5, 1, 2, 3, 4, 5, 10, 15, 20, 30, 40, to 50 percent. As the percentage listed here are for example it should be understood that the skilled artisan contemplates the use of as an additive for each and every value listed between 0.001 and 50, e.g., 37.45% and 14.96%.

The present inventors recognized that most membranes that undergo a surface modification usually have a dramatic pure water flux loss, as the modification usually involves adding a polymer layer that remarkably increases a membrane's overall mass transfer resistance. For an example of this loss in water flux upon modifying, the surface of a membrane, the skilled artisan is referred to Ju et al., Journal of Membrane Science, volume 307, pp. 260-267 (2008) which shows, at Table 3, a reduction in water permeance through the ultrafiltration membrane from 141 L/($m^2$ h bar) in an unmodified membrane to 36 L/($m^2$ h bar) in a membrane which has been modified with poly(ethylene glycol)-type materials. Polydopamine modified membranes can be simply engineered to lose relatively little pure water flux when compared to uncoated membranes, as the amount of polydopamine deposited on the membrane is very small.

Furthermore, delamination is generally a problem when using a highly hydrophilic polymer coating on a hydrophobic membrane, as the hydrophilic polymer coating will swell in water. The present inventors recognized that the chemical structure of polydopamine (e.g., the dopamine monomer contains two hydroxyl groups) most likely leads to strong physical bonding with membrane supports. These physical bonds insure high polydopamine binding so that delamination of the coating layer does not occur. Physical evidence of this strong binding was observed when a polydopamine modified polysulfone UF membrane was sonicated under extreme acidic conditions (3N HCl) for 5 minutes without visual loss of the polydopamine layer.

The present inventors recognized that polydopamine deposition can be used on a variety of surfaces and allows surface modification to a variety of membranes, regardless of membrane material. Most surface modification techniques used in the art have only been accomplished using one specific type of membrane. Polydopamine can be deposited onto virtually any surface with which it comes into contact, allowing it to be used on any membrane. Furthermore, the present inventors recognized that the hydrophilicity of polydopamine rivals that of poly(ethylene-glycol)-modified surfaces (as confirmed by contact angle measurements), which have been used extensively as anti-fouling surface modifiers.

The present inventors recognized that in order for sufficient polydopamine to deposit on a membrane surface it takes a significant amount of time since the oxidation reaction to convert dopamine to polydopamine and the deposition are relatively slow processes. For example, the present inventors used samples that had been immersed in a dopamine solution for 60 minutes for use in studies of reducing biofilm formation and anti-fouling. Although this is not exceedingly long, for industrial practicality, shorter or longer immersion times may be deemed optimal. The present inventors recognized that depending on many factors, the membrane immersion in the dopamine solution may be varied from 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 50, 60, 120 or more than 120 minutes depending on factors such as solution pH, dopamine concentration, substrate material temperature, and so forth.

The present inventors recognized that the polydopamine structure is also of interest in oxidative (alkaline) environments, as properly conjugated molecules will covalently bond to it and allow the use of the polydopamine as an intermediate layer between a hydrophobic membrane and a hydrophilic coating. The polydopamine layer improves adhesion to the membrane support, allowing long-term membrane operation.

Furthermore, the hydrophilicity of the polydopamine structure increases the wettability of polydopamine coated hydrophobic membranes and reduces defects in a hydrophilic coating layer, as the solution used to coat the membrane easily wets the membrane surface. A membrane coating layer further reduces fouling by not allowing foulants to come into contact with the porous structure of the underlying membrane.

The present invention provides a polydopamine deposition layer over a substrate layer and allows the substrate to be a variety of substances and materials. The polydopamine deposition layer of the present invention provides a high hydrophilicity and is suited to alleviate fouling when used to modify water purification membrane surfaces.

Polydopamine, a hydrophilic polymer, can deposit on virtually any surface with which it comes into contact. Therefore, it has potential to be widely used as an effective antifouling coating layer in many membrane water purification applications. The present inventors recognized that a polydopamine layer resists fouling when deposited on reverse osmosis (RO) polyamide, nanofiltration (NF) polyamide, and ultrafiltration (UF) polysulfone membranes. However, the skilled artisan will appreciate that if dopamine can positively influence the fouling characteristics of these membranes, it should also positively influence the fouling characteristics of other membranes and filter media, such as microfiltration (MF) membranes.

The present invention includes a method of decreasing membrane fouling by depositing a polydopamine coating on a membrane to form a polydopamine coated membrane. The polydopamine coated membrane has a high water flux and an increased membrane surface hydrophilicity.

In some instances, the flux of the polydopamine coated membrane is the same as the uncoated membrane and, therefore, exhibits 100% flux when compared to the uncoated membrane. The polydopamine modification can, in some instances with hydrophobic microfiltration membranes or large pore ultrafiltration membranes, impart added wettability to the pore structure, which, when coupled with a negligible decrease in its pore size, leads to an effective increase in pure water flux over that of the unmodified membrane. The polydopamine coated membrane may have a high flux given the presence of a coating on the membrane and range between 150% and 0% flux when compared to the flux of an unmodified membrane. Common high flux values for the polydopamine modified membrane are about 125, 110, 99, 95, 90, 85, 80, 75, 70, 65, 60, 55, 50, 45, 40, 35, 30, 25, 20, 15, 10, and 5% of the flux when compared to a unmodified membrane. However, the skilled artisan will recognize that the percentages are estimates and may vary by ±5 percent. In addition, the polydopamine, the membrane, or both may be further modified by the addition of one or more of the following: nanometals, nanoparticles, halogens, hydroxyl groups, lower alkyl groups, lower alkoxy groups, monocyclic aryl, lower acyl groups, one or more functional groups chosen from ROOH, ROSH, RSSH, OH, $SO_3H$, $SO_3R$, $SO_4R$, COOH, $NH_2$, NHR, $NR_2$, $CONH_2$, and $NH-NH_2$, wherein R denotes: linear or branched hydrocarbon-based chains, capable of forming at least one carbon-based ring, being saturated or unsaturated; alkylenes, siloxanes, silanes, ethers, polyethers, thioethers, silylenes, silazanes and combinations thereof.

The support membrane used for polydopamine modification may include one or more of the following: polymethylmethacrylates, polystyrenes, polycarbonates, polyimides, epoxy resins, cyclic olefin copolymers, cyclic olefin polymers, acrylate polymers, polyethylene teraphthalate, polyphenylene vinylene, polyether ether ketone, poly(N-vinylcarbazole), acrylonitrile-styrene copolymer, or polyetherimide poly(phenylenevinylene), polysulfones, sulfonated polysulfones, copolymers of styrene and acrylonitrile poly(arylene oxide), polycarbonate, cellulose acetate, piperazine-containing polymers, polyelectrolytes, poly(styrenes), styrene-containing copolymers, acrylonitrilestyrene copolymers, styrene-butadiene copolymers, styrene-vinylbenzylhalide copolymers; polycarbonates; cellulosic polymers, cellulose acetate-butyrate, cellulose propionate, ethyl cellulose, methyl cellulose, nitrocellulose, polyamides, polyimides, aryl polyamides, aryl polyimides, polyethers, poly (arylene oxides), poly(phenylene oxide), poly(xylene oxide); poly(esteramide-diisocyanate), polyurethanes, polyesters (including polyarylates), poly(ethylene terephthalate), poly (alkyl methacrylates), poly(acrylates), poly(phenylene terephthalate), polysulfides, poly (ethylene), poly(propylene), poly(butene-1), poly(4-methyl pentene-1), polyvinyls, poly(vinyl chloride), poly(vinyl fluoride), poly(vinylidene chloride), poly(vinylidene fluoride), poly(vinyl alcohol), poly(vinyl esters), poly(vinyl acetate), poly(vinyl propionate), poly(vinyl pyridines), poly(vinyl pyrrolidones), poly (vinyl ethers), poly(vinyl ketones), poly(vinyl aldehydes), poly(vinyl formal), poly(vinyl butyral), poly(vinyl amides), poly(vinyl amines), poly(vinyl urethanes), poly(vinyl ureas), poly(vinyl phosphates), poly(vinyl sulfates), polyallyls; poly (benzobenzimidazole), polyhydrazides, polyoxadiazoles, polytriazoles, poly (benzimidazole), polycarbodiimides, polyphosphazines and combinations thereof.

A membrane coating layer further reduces fouling by not allowing foulants to come into contact with the porous structure of the underlying membrane. The binding of hydrophilic layers to hydrophobic membranes also serves a practical purpose in other membrane applications, including pervaporation and gas separations, in which the swellability of the hydrophilic polymer is an issue.

FIG. 1 is a schematic of the structure of dopamine and polydopamine. The dopamine self-polymerization reaction changed the color of the solution from transparent red to dark brown in less than one hour and the deposited polydopamine was visible on the membrane surface after only a few minutes of immersion time. This deposited layer was tightly bound to the surface of the membrane, as there was no membrane discoloration even after sonication under 3N HCl for about 5 minutes. In addition, scratching the membrane surface did not visibly remove the deposited layer.

Although the schematic above provides a dopamine and polydopamine structure, the present invention also provides for other amine substituted benzenediol compositions that may be used. For example, the present invention may use other any aromatic dihydroxy group-containing molecule to form a membrane modifying agent. The Aromatic molecule may contain 3 to 8 carbons and include one or more hetero atoms, e.g., benzothiazole, benzisoxazole, benzoxazole, indazole, purine, benzimidazole, benzo[c]thiophene, benzothiophene, isoindole, indole, isobenzofuran, benzofuran, naphthalene, naphthalene derivatives, quinoline, quinazoline, cinnoline, isoquinoline and substations and modifications thereof. Furthermore, dopamine or other aromatic dihydroxy and amine-containing molecules could be copolymerized or one member of a multi-monomer composition with a variety of different molecules containing aromatic dihydroxy, amine, or thiol functionality. These polymers can also be used to modify membrane surfaces.

Figure 2:
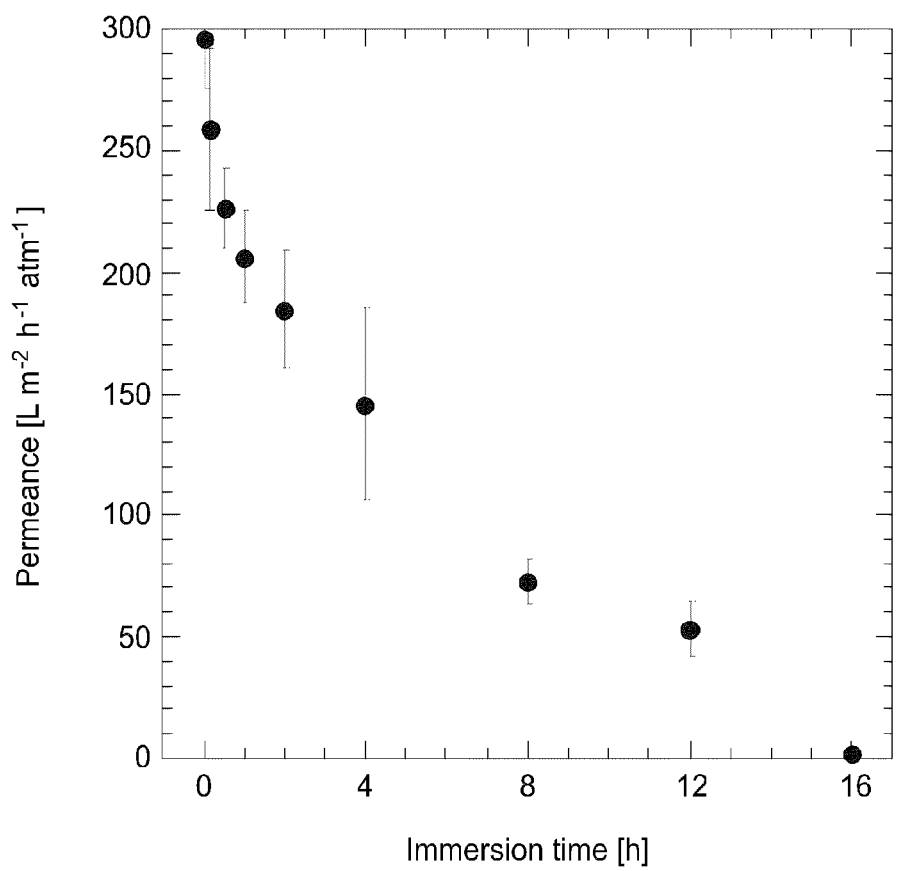
FIG. 2 is a plot of the permeance of ultrafiltration (UF) polysulfone membranes with different polydopamine deposition times.

FIG. 2 is a plot of the permeance of UF polysulfone membranes with different polydopamine deposition times. Water transport through a polydopamine-modified polysulfone membrane was characterized as a function of membrane immersion time in the dopamine polymerization solution. The water flux decreased with increasing immersion time, as a larger amount of polydopamine was allowed to deposit on the membrane. However, a point of interest arose when studying membranes immersed for less than 1 hour as these membranes showed only slight decreases in water flux when compared to an unmodified membrane. For example, a membrane with an immersion time of 30 minutes retained approximately 80% of an unmodified membrane pure water flux. This suggests that the membrane's pore structure was generally unaffected by the polydopamine deposition at low immersion times. The polydopamine did not form a defect-free adlayer on the surface of the membrane, but rather deposited conformally on the membrane surface and the membrane pore structure. Therefore, using small-time polydopamine immersions led to a membrane with higher hydrophilicity, as seen with contact angle measurements, without a significant loss of membrane pure water flux. Table 1 shows the correlation between hydrophilicity as seen with contact angle measurements and the exposure time of the substrate in a dopamine solution. Table 1:

TABLE 1

| Soak time [h] | Contact angle (°) |
|---|---|
| 0 | 108.7 ± 5.0 |
| 0.16 | 49.3 ± 6.9 |
| 1 | 48.6 ± 4.0 |
| 2 | 57.8 ± 2.5 |
| 4 | 47.0 ± 4.7 |
| 8 | 47.3 ± 1.1 |
| 12 | 52.5 ± 4.1 |
| 16 | 54.7 ± 7.5 |

Decane-in-water captive bubble contact angle measurements were used to investigate surface hydrophilicity. Table 1 illustrates decane in water captive bubble contact angles for polysulfone membranes with various dopamine deposition times. Because of a spontaneous, fast polydopamine deposition, a dramatic increase in the polysulfone membrane surface hydrophilicity was seen. As presented in the above Table 1, a polysulfone UF membrane contact angle significantly decreased after only 10 minutes of dopamine immersion. The contact angle for membranes immersed for larger periods of time indicate that the surface hydrophilicity remained unaffected after the initial polydopamine deposition occurs. A similar increase in surface hydrophilicity was exhibited for polyamide (PA) RO (XLE membranes from Dow FilmTec) and PA NF membranes (NF-90 membranes from Dow FilmTec), as the decane contact angles for unmodified PA RO and PA NF membranes were 45°±3 and 49°±2, respectively, whereas membranes with a deposition time greater than 30 minutes had a contact angle of 36°±4 (PA RO) and 40°±3 (PA NF). This increase in surface hydrophilicity had a dramatic impact on a membrane fouling resistance.

At larger immersion times, the dopamine deposition eventually leads to a constriction of the pore structure, therefore reducing membrane flux. This constriction is also of interest (e.g., immersion times >16 hours), as polydopamine is capable of forming a highly hydrogen bonded network, with unique separation properties in areas such as gas separations or water desalting applications.

Figure 3B:
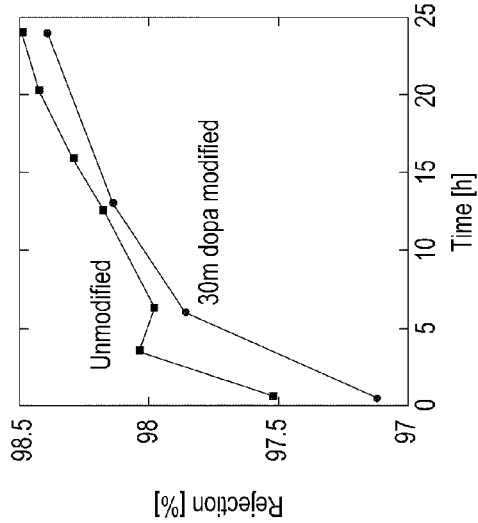
FIGS. 3A, 3B, 3C, 3D, and 3E and 3F, are graphs of membrane fouling studies on polydopamine modified and unmodified UF, nanofiltration (NF) and reverse osmosis (RO) membranes.
Figure 3D:
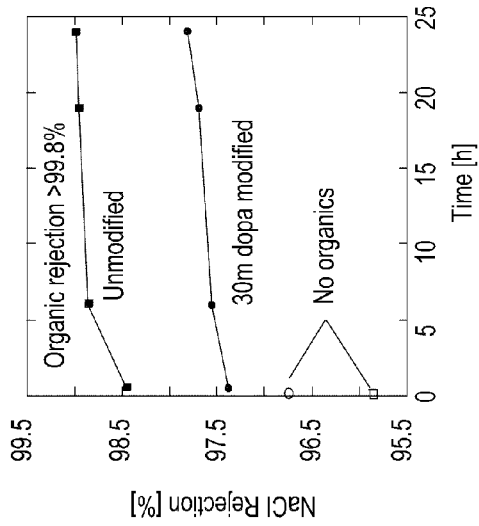
Figure 3A:
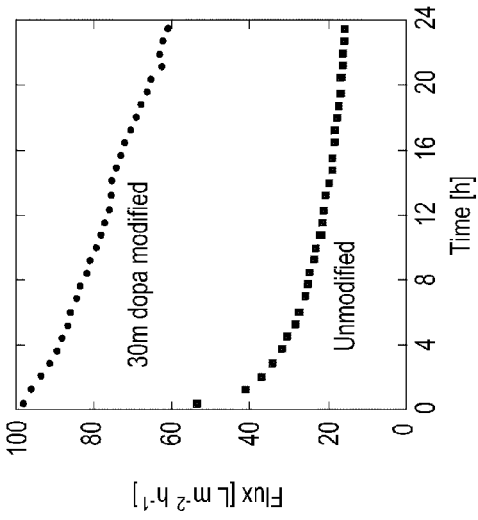
Figure 3C:
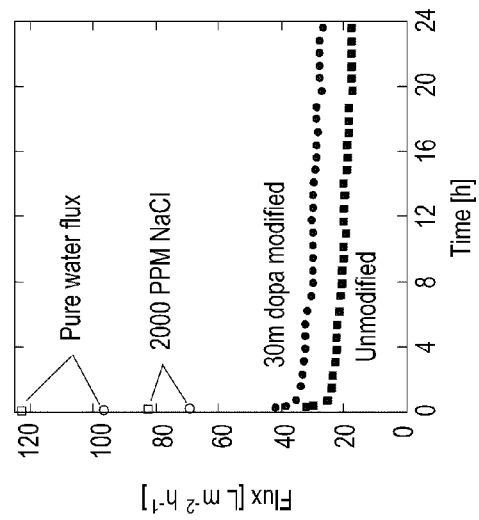
Figure 3E:
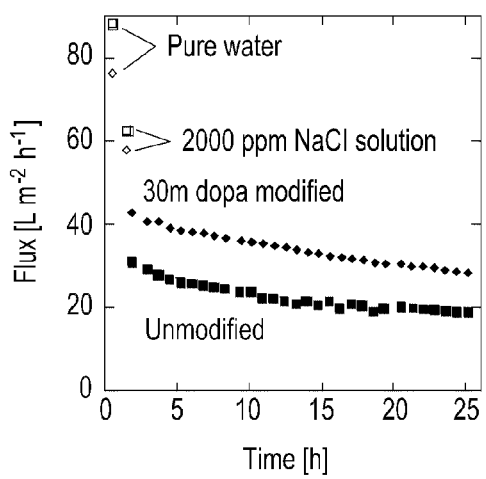
Figure 3F:
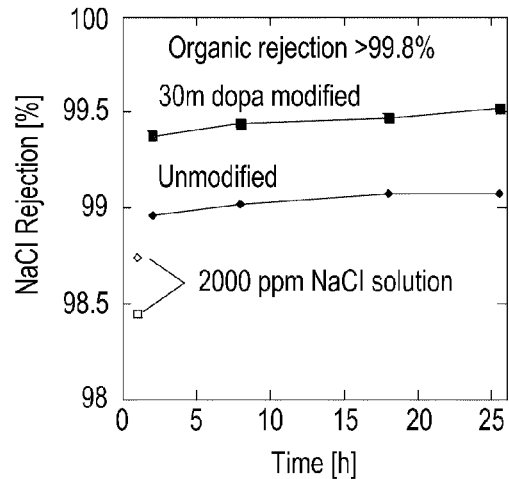

FIGS. 3A, 3B, 3C, 3D, 3E and 3F are graphs of membrane fouling studies. FIG. 3A is a graph of the flux as a function of time and FIG. 3B is a graph of the percent total organics rejected as a function of time for a 1500 ppm oil-water emulsion (1350 ppm vegetable oil plus 150 ppm DC-193 surfactant) fouling of an unmodified PSf ultrafiltration membrane (an A-1 membrane from GE Water) and a PSf membrane (an A-1 membrane from GE Water) with a polydopamine deposition layer formed from a 30 minute exposure to a dopamine solution. FIG. 3C is a graph of the flux as a function of time and FIG. 3D is a graph of the percent total salt rejected as a function of time for a 1500 ppm oil-water emulsion with 2000 ppm NaCl being filtered through an unmodified RO membrane (Dow FilmTec XLE) and an RO membrane with a polydopamine deposition layer formed from a 30 minute exposure to a dopamine solution. FIG. 3E is a graph of flux as a function of time and FIG. 3F is a graph of percent total NaCl rejected as a function of time for a 1500 ppm oil-water emulsion with 2000 ppm NaCl being filtered by an unmodified NF membrane (Dow FilmTec NF-90) and an NF membrane modified by a 30 minute exposure to a dopamine solution. Polydopamine leads to an increase in membrane fouling resistance in UF, NF and RO membranes. For example, FIG. 3A shows that after 1 day of oily water filtration, a dopamine-treated membrane exhibits a flux nearly 4 times higher than that of its unmodified counterpart. Similarly, the RO and NF membranes in FIGS. 3B and 3D also have a higher flux during oil-water emulsion filtration when treated with dopamine.

Furthermore, the dopamine-treated ultrafiltration membranes also exhibit slightly higher organic rejection than unmodified PSf membranes. Salt rejection of an unmodified RO and NF membrane is lower than that of their respective polydopamine-modified membranes when no organics are present in the feed stream. However, the unmodified RO and NF membranes exhibit slightly higher salt rejection in fouling experiments than polydopamine modified membranes. This is most likely caused by a thicker oil cake layer at the surface of the unmodified membranes, which creates a larger resistance to salt permeability.

Figure 4A:
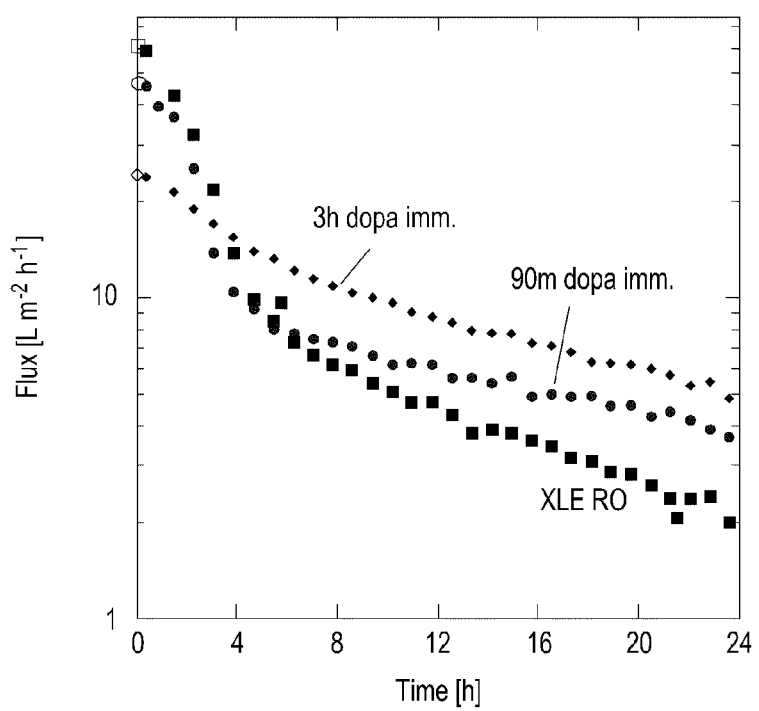
FIGS. 4A, 4B, and 4C are plots comparing fouling of polydopamine modified UF and RO membranes, polydopamine modified UF and RO membranes with amine-terminated poly(ethylene glycol) grafted to its surface, and unmodified UF and RO membranes.

FIG. 4A presents the non-ionic surfactant/vegetable oil fouling curves for an unmodified polysulfone UF membrane, a polysulfone UF membrane modified by 30 minute exposure to a dopamine solution, and a polysulfone UF membrane modified by 30 minute exposure to a dopamine solution followed by poly(ethylene glycol) (PEG) amine (Mw=1,000) grafting to the polydopamine layer. PEG has been shown to resist foulant adhesion to many surfaces and is therefore used here for the same purpose. As can be seen, attachment of PEG to the polydopamine layer increases the fouling resistance of the UF membrane, as the flux of the PEG-functionalized membrane is approximately 30% higher than that of the polydopamine modified membrane after one day of oil-water filtration.

Figure 4B:
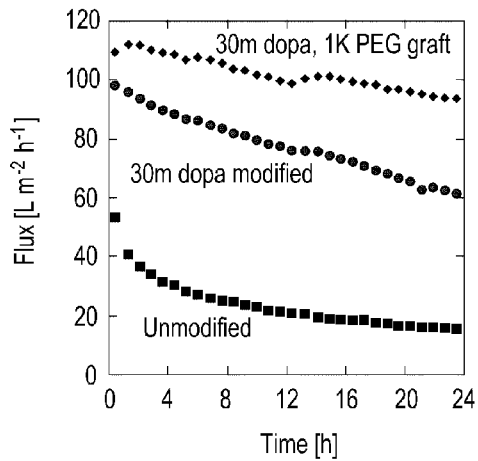

FIG. 4B presents similar data for the polyamide RO membranes. A polydopamine modified RO membrane exhibited a flux approximately 30% higher than that of its unmodified counterpart after one day of oil-water filtration. When PEG amine (Mw=5,000) was grafted to the polydopamine layer, the initial flux of the membrane was relatively low (21 $L^{-2}$ $m^{-2}$ $h^{-1}$) However, virtually no fouling of this membrane was seen over the course of one day of filtration, as the flux of this membrane remained almost identical to that of its initial flux.

Figure 4C:
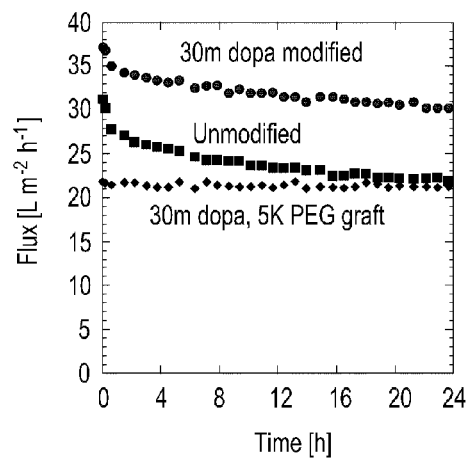

FIG. 4C is a graph of flux as a function of time for a 135 ppm decane/15 ppm dodecyltrimethyl ammonium bromide (DTAB)-water emulsion fouling of an unmodified RO membrane, a RO membrane with 1.5 hour polydopamine deposition, and a RO membrane with 1.5 hour polydopamine deposition followed by PEG amine (Mw=5,000) grafting to the polydopamine layer. FIG. 4C shows that dopamine-treated membranes can resist fouling when charged surfactants are prevalent as foulants (in this case, DTAB is the charged surfactant), as the final polydopamine-modified membrane flux is approximately 2 times higher (3.1 $Lm^{-2}h^{-1}$ for the polydopamine modified membrane to 1.7 $Lm^{-2}h^{-1}$ for an unmodified RO membrane) than that of an unmodified membrane after one day of filtration. The initial flux of the polydopamine/PEG membrane was relatively low (21 $Lm^2h^1$). However, PEG grafting to the polydopamine layer exhibited a marked improvement in membrane fouling resistance, as the membrane retained approximately 40% of its original flux after one day of filtration (final flux at 24 h was 8 $Lm^{-2}h^{-1}$). We can therefore conclude that polydopamine is a versatile method to graft PEG to any membrane surface and that this polydopamine/PEG layer dramatically improves the fouling resistance of a membrane. The skilled artisan will recognize that many examples of the type of PEG or related structures that can be grafted to a dopamine structure given the present invention. For example, many such compounds are taught in U.S. Pat. No. 6,280,853, which is incorporated herein by reference.

Figure 5:
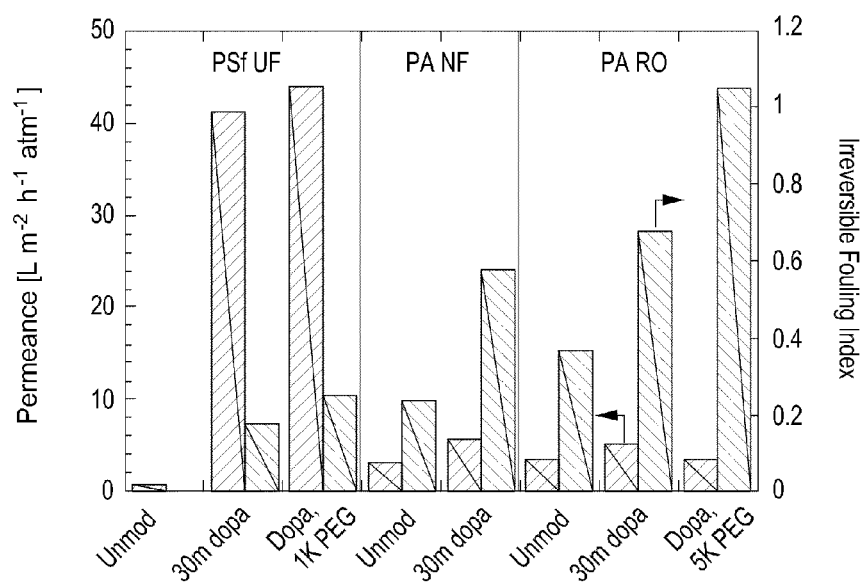
FIG. 5 is a plot comparing pure water flux through nascent (unfouled) and fouled polydopamine modified and unmodified UF, NF, and RO membranes.

FIG. 5 presents pure water permeance of the unmodified, polydopamine modified, and polydopamine/PEG UF, NF, and RO after 1 day of fouling experiments. Prior to collecting the pure water data, the membranes were rinsed (to remove any unbound foulants) and stored in ultra-pure water. FIG. 5 also shows the ratio of these membranes' pure water permeance before fouling and after fouling (termed the irreversible fouling index). Irreversible fouling, for the purposes of this study, is defined as the flux loss during a fouling experiment that cannot be recovered by simple rinsing/cleansing steps. As a reference a perfectly non-fouling membrane would have an irreversible fouling index of 1. Polydopamine greatly enhanced a membrane's pure water flux. For example, an unmodified polysulfone UF membrane only exhibited a permeance of 0.09-0.3 $L\,m^{-2}\,h^{-1}\,atm^{-1}$ after fouling, whereas a polydopamine modified UF membrane exhibited a permeance of 40.8 $L\,m^{-2}\,h^{-1}\,atm^{-1}$ and a polydopamine with PEG amine (Mw=1,000) grafting modified UF membrane exhibited a permeance of 43.7 $L\,m^{-2}\,h^{-1}\,atm^{-1}$. NF and RO modified membranes exhibited higher water permeances over their unmodified counterparts, as well. Furthermore, grafting PEG amine to the surface of these membranes dramatically enhanced the irreversible fouling resistance of the UF and RO membranes, as the irreversible fouling index of the polydopamine/PEG membranes was higher than that of unmodified and only polydopamine modified membranes. FIG. 5B presents pure water permeance and the irreversible fouling index of the unmodified, polydopamine modified, and polydopamine/PEG (PEG Mw=5,000) RO membranes after a 1 day, 150 ppm DTAB/decane emulsion fouling experiment. Prior to collecting the pure water data, the membranes were cleansed by circulating HCl solution (pH=1.5) followed by NaOH solution (pH=12.5) for 1 hour each through the cross-flow system (and therefore over the membranes' surfaces). Similarly to the non-ionic oil emulsion irreversible fouling data, a dramatic flux recovery improvement was seen in the polydopamine modified and polydopamine/PEG RO membranes. For example, after one day of DTAB/decane emulsion filtration and a cleansing cycle, the unmodified membrane had a pure water permeance of 0.3 $Lm^{-2}h^{-1}atm^{-1}$, whereas the polydopamine modified and polydopamine/PEG membranes had permeances of 2.8 and 3.0 $Lm^{-2}h^{-1}atm^{-1}$, respectively. Furthermore, the irreversible fouling index of these membranes dramatically increase after modification (0.04 for an unmodified RO membrane, 0.5 and 1.0 for the polydopamine and polydopamine/PEG RO membranes, respectively). These data indicate that polydopamine deposition and polydopamine deposition/PEG grafting on membrane surfaces leads to improved membrane efficiency after a cleansing cycle.

Figure 6:
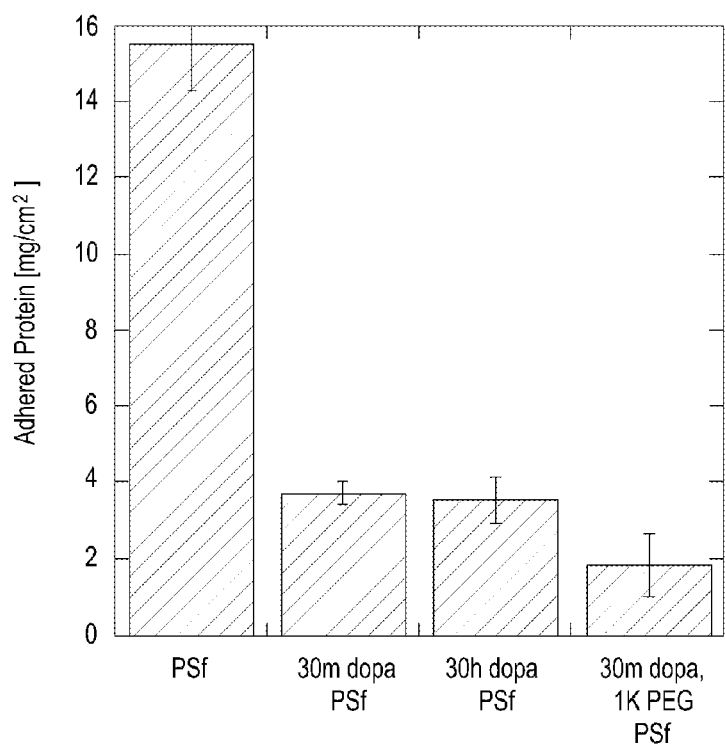
FIG. 6 is a plot of static protein adhesion to various substrates as measured by a magnetic suspension balance.

FIG. 6 presents static bovine serum albumin adhesion data to an unmodified polysulfone UF membrane, a polysulfone UF membrane modified by exposure to a dopamine solution for 30 minutes, a polysulfone UF membrane modified by exposure to a dopamine solution for 3 hours, and a polysulfone UF membrane modified by exposure to a dopamine solution for 30 minutes followed by PEG amine (Mw=1,000) grafting. The dopamine deposition clearly reduced protein adhesion to polysulfone membranes, as there is a 5-fold decrease in total adhered protein between the unmodified membrane and the polydopamine-treated membrane. Furthermore, an almost two-fold decrease in protein adhesion occurred between the polydopamine-treated membranes and the PEG-grafted membrane. These data clearly show the efficacy of dopamine treatment to reduce protein adhesion to membranes, which is a critical step in eliminating membrane fouling.

Polysulfone ultrafiltration A1 support was provided by General Electric Water and was used as the UF membrane in the examples described in this specification. Reverse osmosis polyamide membranes (XLE RO) and nanofiltration polyamide membranes (NF-90) were provided by Dow Filmtec and served as the RO and NF membranes, respectively, described in the examples. Dopamine, Trizma (TRIS), decane, DTAB, bovine serum albumin and sodium hydroxide were purchased from Sigma Aldrich. Amine terminated PEG (PEG amine) was purchased from Laysan Bio, Inc, Arab, Ala. (Mw=1,000) and JenKem Tech, Allen, Tex. (Mw=5,000). Ultrapure water (18.2 Mohm-cm, <1 ppb TOC) was produced from a Gradient A10/RiOs Millipore water purification system. DC193 non-ionic surfactant was purchased from Dow Corning. Wesson vegetable oil was purchased from a local supermarket.

Dopamine deposition onto membranes was accomplished by soaking a 5 inch×5 inch membrane section in isopropanol for at least 30 minutes. The membrane was then transferred to ultrapure water, where it was immersed for at least 2 hours with the water being changed 2-3 times to insure removal of all of the isopropanol. Once the water rinsing was completed, the membranes were taped to a glass plate and a casting ring (e.g., 12 cm diameter) was securely fastened to the surface of the membrane. The membrane was rinsed under running ultrapure water before the dopamine solution was added to the glass ring. After membrane preparation, 0.1 gram of dopamine-HCl was added to 50 mL of 10-15 mM TRIS buffer (pH=8.8). The sample was vortexed for 5 seconds. The solution was immediately placed in the casting ring. The solution was stirred using a rocker (e.g., 4 degrees and 50 rpm). The solution gradually changed from slightly transparent red color to dark brown color over the course of the reaction. A visible, brown-colored deposition occurred on the membrane surface. The deposition color became darker as the deposition time increased. Membranes were then rinsed and stored in ultrapure water until their use.

PEG grafting to the polydopamine surface layer was accomplished by immersing polydopamine modified membranes in a 1 mg/mL PEG amine (Mw=1000 or 5000) in 15 mM TRIS buffer (pH=8.8-9) solution at 50-60° C. for one hour for RO membranes and 10 hours for UF membranes. Amine groups will react with the catechol-like polydopamine structure under alkaline conditions via a Michael Addition or Schiff base reaction. The membranes were then rinsed and stored in ultrapure water before use.

Fouling studies were performed using a crossflow filtration unit as a final test of a membrane's anti-fouling capabilities. The feed stream was pressurized and passed tangentially to the membrane surface, creating a shear force at the membrane surface to reduce concentration polarization/surface fouling. This type of filtration is widely used in industrial filtration and is, therefore, useful for evaluating the fouling characteristics of membranes.

A non-ionic oil/water emulsion was prepared by adding 40.5 grams of vegetable oil and 4.5 grams DC193 surfactant (9:1 oil:surfactant ratio) to water to make 3 kilograms of total solution. Decane/DTAB emulsions were prepared by adding 4.05 grams decane, 0.45 grams DTAB to water to make 3 kilograms of total solution. The mixtures were blended at 20,000 rpm for 3 minutes in a high-speed blender (Waring LBC15, Torrington, Conn.). The mixtures were diluted with pure water to make a total organic concentration of 1,500 ppm for the non-ionic oil/water emulsion or 150 ppm for the decane/DTAB emulsion. Fresh emulsions were prepared for each experiment. However, the crossflow equipment used could test up to three membranes at a time. The crossflow system was purchased from Separation Systems Technologies, San Diego, Calif.

During crossflow filtration, the transmembrane pressure difference could be adjusted to any value between 2 atm and 20 atm, and the crossflow velocity could be adjusted from 0.4 L/m to 4 L/m, corresponding to a Reynolds numbers ranging from 400 to 4000 according to the geometry of the flow channels (e.g., 3" long×1" wide×⅛" deep). This study was restricted to transmembrane pressure differences of 100 psi (6.8 atm) and a crossflow velocity of 1.3 L/min (Re~1500) for the polysulfone UF membranes, and 150 psi (10.2 atm) and a crossflow velocity of 3.75 L/min (Re~4500) for the NF and RO membranes. Membrane rejection properties are calculated by testing the total organic carbon concentration in the feed and permeate using a TOC analyzer (Shimadzu Scientific Instruments Total Organic Carbon Analyzer, Model 5050A, Columbia, Md., USA).

Irreversible fouling studies were performed by running non-ionic oil/water emulsion or DTAB/decane emulsion fouling on membranes for 24 hours. After the non-ionic oil/water emulsion fouling studies, the UF and NF membranes were removed from the cells and rinsed three times under running ultrapure water over the course of 1 day and stored in water between rinses. Three one-inch diameter sections were cut from the active area of the membranes and pure water flux at 50 psi was recorded on each of these samples in a 3.5 cm$^2$ active area dead-end cell (AdvantecMFS, Dublin, Calif.). The average of these samples' fluxes were calculated and divided by the transmembrane pressure (50 psi) to calculate the after-fouling pure water permeance.

The RO membranes were rinsed after a non-ionic oil/water emulsion fouling study using the following protocol: the system was flushed once with ultrapure water to remove any oil-water emulsion and filled with ultrapure water. The water was allowed to circulate through the membrane cells at 50 psi transmembrane pressure difference. This process was repeated two more times (for a total of three flush/rinse cycles) every 20 minutes (for a total rinsing time of one hour). Once rinsing was complete, the system was filled with ultrapure water and the membranes' pure water flux was recorded at 150 psi transmembrane pressure difference. The irreversible fouling index was calculated by dividing the pure water permeance (pressure normalized flux) of the membranes after the fouling experiment by the pure water permeance of the membrane before a fouling experiment. The pure water permeance before a fouling experiment was measured in a 11.5 cm$^2$ dead-end cell (Advantec MFS) at various pressures (i.e. 15, 30, 45 psi) on a separate membrane sample for the UF membranes. The pure water permeance before a fouling experiment was measured in the crossflow system at 150 psi transmembrane pressure difference for both the NF and RO membranes. For the DTAB/decane emulsion irreversible fouling experiment on the RO membranes, a cleansing cycle was performed after one day of filtration using the following protocol: the crossflow system was flushed once with ultrapure water (to remove any DTAB/decane emulsion). The system was filled with 10 L of ultrapure water and its pH was adjusted to 1.5 using HCl solution. The acidic solution was allowed to circulate through the system at 50 psi and 45° C. for 1 hour. The system was then flushed with ultrapure water and filled with 10 L of ultrapure water whose pH was adjusted to 12.5 using NaOH. The alkaline solution was circulated through the system at 50 psi and 45° C. for 1 hour. The system was then flushed with ultrapure water twice to insure all contaminants had been removed. The system was then filled with ultrapure water and the membranes' water fluxes were recorded at 150 psi.

To test pure water permeability of the polysulfone UF membranes in FIG. 1, cylindrical stirred dead-end cells were used. In this mode of filtration, the whole feed stream is allowed to challenge the membrane, making it ideal for studying pure water permeation. Pure water flux studies were performed for each membrane at three pressures: 10, 20 and 40 psi (0.7, 1.3 and 2.7 atm), respectively. Dead-end cell sizes with effective filtration areas of 11.5 cm$^2$ were used.

The static protein adhesion procedure was accomplished by comparing the weight of 6 membrane samples after a protein adhesion and the weight of the same membranes before the protein adhesion. Membranes were thoroughly rinsed and soaked in isopropanol for at least 2 hours, then ultrapure water for at least 2 hours before they were weighed before the protein adhesion study. The weight of the membranes was analyzed using a magnetic suspension balance (Rubotherm, Germany), which has an accuracy of +1 μg. The protein adhesion study was performed by placing a 1 inch diameter membrane into a dead-end filtration cell. 2 mL of a 1 mg/mL bovine serum albumin in pH=7.0 phosphate buffered saline solution was introduced into the dead end cell and incubated at room temperature. After 1 hour, the protein solution was decanted from the cell, the membrane was removed and rinsed three times in ultra-pure water to remove any salt residue introduced by the phosphate buffered saline and any unbound proteins (a total time of 1 hour was used in the rinsing process). The membranes were dried at 50° C. for 30 minutes before being placed in the magnetic suspension balance. 6 membranes (with a total surface area of 21 cm$^2$) were weighed in the balance at the same time. The weighing was performed under vacuum and the 6 membranes' weight was allowed to come to equilibrium for at least 30 minutes before their final weight was recorded.

Although dopamine is discussed here as a membrane modifying agent, multiple embodiments using the functionalized chemistry seen in dopamine could lead to similar anti-fouling membrane coatings. These key functionalities are the catechol-like dihydroxy phenyl group and the amine group, which have been identified in the literature as key elements in a Mussel's adhesive plaque. Therefore molecules, or multiple molecules, whose substituents include aromatic dihydroxy groups and amine groups, could be used to modify membrane surfaces. Furthermore, thiol groups have also been shown to react with the catechol-like dihydroxy phenyl group. Therefore, any thiol containing molecule could also be combined with any aromatic dihydroxy group-containing molecule to form a membrane modifying agent. Furthermore, dopamine or other aromatic dihydroxy and amine-containing molecules could be copolymerized with a variety of different molecules containing aromatic dihydroxy, amine, or thiol functionality. These new polymers can also be used to modify membrane surfaces.

Currently, almost all conventional membrane modifications are performed before they are placed in modules. In contrast, the polydopamine treatments and compositions of the present invention have an advantage over other conventional surface modification techniques in that the surface modification can be performed on the membranes after they have been processed into module form. The present invention provides methods and compositions for the modification of conventional water purification membranes purchased in spiral-wound modules, hollow fiber modules, flat sheets or other preformed structures (as described elsewhere). To coat polydopamine and similar adherent polymers to commercial membranes on a large scale, a slightly modified water purification crossflow system can be used. For example, FIG. 7 illustrates an image and schematic of a laboratory-scale crossflow system.

Figure 7:
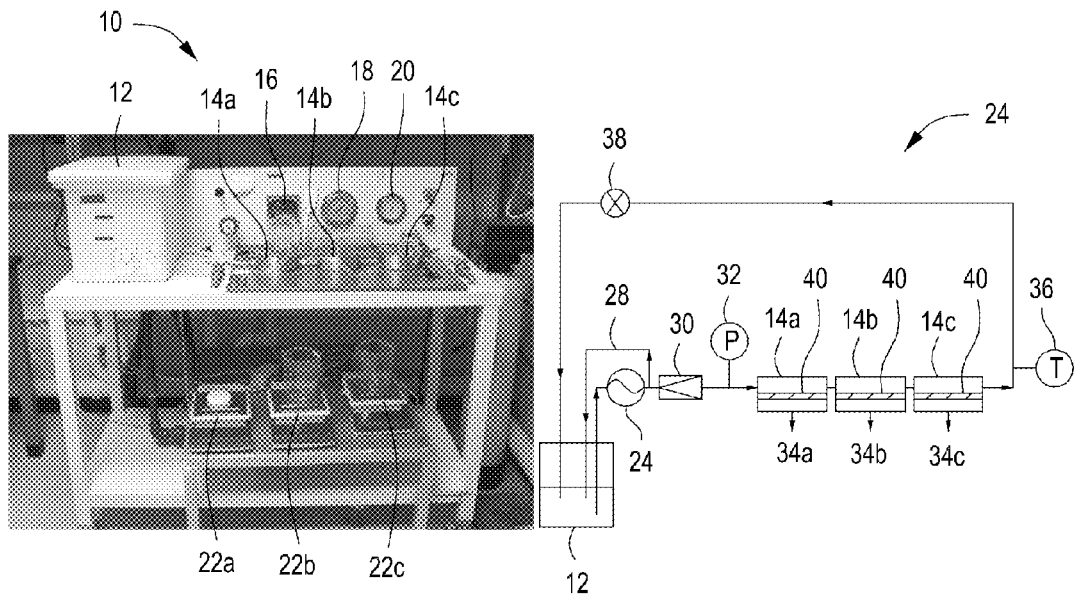
FIG. 7 illustrates a crossflow system having a feed tank connected to membrane cells.

FIG. 7 illustrates a crossflow system 10 having a feed tank 12 connected to membrane cells 14a, 14b and 14c. The crossflow system 10 may also include a flow meter 16, pressure gauge 18, thermometer 20 and balances 22a, 22b and 22c. As a crossflow system schematic 24 it can be seen that the feed tank 12 is kept at a constant temperature and connected to a pump 26 that is connected to a bypass 28, a flow-meter 30 and pressure gauge 32. The pressure gauge 32 is connected to one or more membrane cells 14a, 14b and 14c. Although that are 3 membrane cells illustrated here, the skilled artisan will recognize that this is for simplicity sake only and the present invention may include numerous membrane cells 14. The one or more membrane cells 14a, 14b and 14c allow some of the substance to pass through and be collected 34a, 34b and 34c. Although this is depicted as separate containers the skilled artisan will readily understand that there may be a single or numerous containers. A temperature gauge 36 and a may be fitted to the system. In the crossflow system 10 pictured in FIG. 7, the feed water in the feed tank 12 is pumped through a series of membrane cells 14 at high transmembrane pressure. A portion of the feed water contacts the membrane surface 40 and allows pure water to pass through the membrane 40 and collected 34, while rejecting contaminants. The portion of the feed water that does not pass through the membrane 40 is returned to the feed tank 12 for future filtration.

Figure 8:
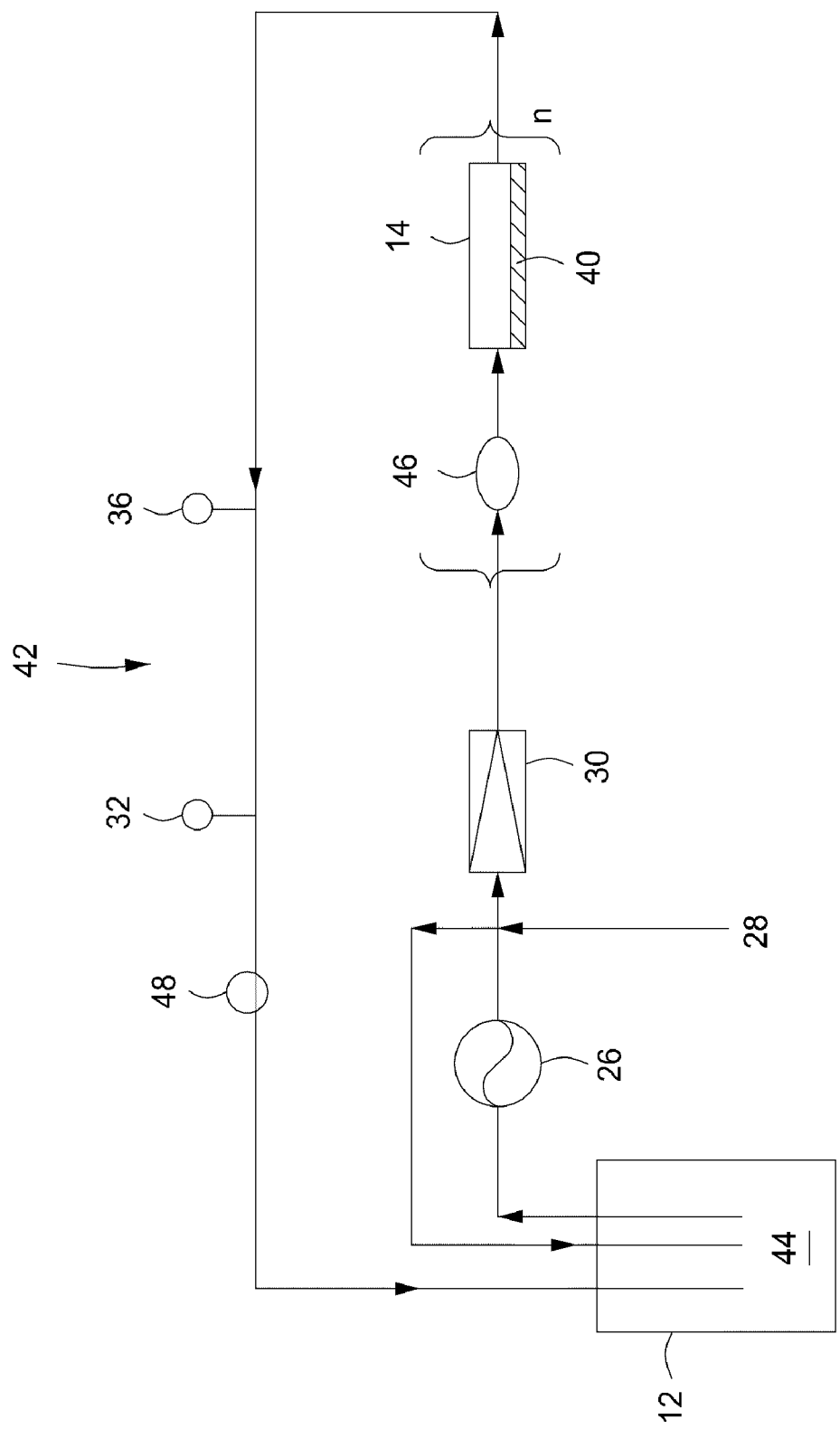
FIG. 8 is a schematic of a modified crossflow system.

A schematic of the modified crossflow system is shown in FIG. 8. The modified crossflow system 42 includes a feed tank 12 which contains a dopamine solution 44 and is connected to a pump 26 that is connected to a bypass 28, a flow-meter 30. Optionally, modified crossflow system 42 may include a filter 46 positioned before membrane cells 14 and membrane module 40. The modified crossflow system 42 may also be connected to a pressure gauge 32, temperature gauge 36 and/or a pressure regulator 48 in any order or combination necessary. In addition, the present invention may include "n" number distributions of a filter 46 positioned before membrane cells 14. "n" may be 1, 2, 3, 4, 5, 6, 7, 8, 9, 10-100, or more than 100 repeats. Although that is only one (1) filter 46 positioned before one (1) membrane cell 14 illustrated here, the skilled artisan will recognize that this is for simplicity sake and the present invention may include numerous membrane cells 14. In the crossflow system 10 pictured in FIG. 8, the dopamine solution 44 in the feed tank 12 is pumped using pump 26 through a series of one or more membrane cells 14 at high transmembrane pressure. The dopamine solution 44 passes in contact with the membrane surface 40 and allows the dopamine solution 44 to be deposited on the membrane 40. The remaining dopamine solution 44 is returned to the feed tank 12.

The present invention provides polydopamine treatments for surface membranes that have been processed into module forms. For example, coat spiral-wound membranes, hollow fiber membranes, and flat sheet membranes with polydopamine, a standard crossflow system (one such system is described above) may be modified in three ways. First, the permeate side of the membrane module 40 is initially blocked to eliminate the dopamine solution 44 from being transmitted through the membrane 40. A rubber stopper or a clamp (or other device known to the skilled artisan) (not shown) can be used to block the membrane 40 and is removed after the dopamine treatment. Second, an alkaline dopamine solution 44 forms microparticles (not shown) that impede water flow through the feed-side of membrane modules 40 and therefore must be removed from the removed from the feed stream. A particle filter 46 is placed in-line near the inlet of each membrane module 40 to remove microparticles (not shown) that form during the polydopamine formation. Alternatively, a particle filter 46 maybe placed further up-line before the distribution to the inlet of each membrane cell 14. The skilled artisan will readily know that other filters 46 or series of filters (not shown) may be used to accomplish filtration prior to the inlet of each membrane module 14. Therefore, these particles can be removed before the dopamine solution 44 is introduced into the membrane module 14. The particle filter 46 nominal pore diameter may be in between 0.05 microns and 20 microns, with a preferable nominal pore diameter of approximately 5 microns. The particle filter 46 nominal pore diameter need only be sufficient to filter the particles and may use a series of filters 46 with different pore diameters. Third, a small pump 26 is used in place of the high-powered pump to achieve high transmembrane pressures. The pump 26 should be capable of operating at low pressures (e.g., 0-50 psig, with a preferable pressure range in between 0-10 psig) and flow-rates that keep the residence time of the dopamine solution 44 in each membrane cell 14 between 0.0 seconds and 3 hours, with a preferable residence time between 0.0 seconds and 10 minutes. The small residence time ensures that no microparticles are formed in the membrane cell 14. Residence time is defined as the total feed-side volume of a membrane cell 14 divided by the volumetric flow rate of the feed-side dopamine solution 44.

The present invention also provides a method, apparatus and modified crossflow system 42 for the treatment of numerous modules in series. As membrane cells 14 can be added to the modified crossflow system in series, numerous membrane cells 14 (e.g., from 0-100,000,000) can be polydopamine-treated at once. The modified crossflow system can include any number of membrane modules (e.g., 1-10, 10's, 100's, 1000's, 10,000's, 100,000's to more than 100,000,000 membrane modules) connected in series or parallel, series of modules.

The membrane being modified may be in part or entirely made of one or more polymers. For example, the polymer surface may include Polyethylene (PE); Polypropylene (PP); Polystyrene (PS); Polyethylene terephthalate (PET or PETE); Polyamide (PA); Polysulfone; Sulfonated polysulfone or any other polyelectrolyte that is suitable for membrane use; Polyester Polyvinyl chloride (PVC); Polycarbonate (PC); Acrylonitrile butadiene styrene (ABS); Polyvinylidene chloride (PVDC); Polytetrafluoroethylene (PTFE); Polymethyl methacrylate (PMMA); Polylactic acid (PLA), Polypiperazine, and combinations thereof. In addition, the Polyethylene (PE); Polypropylene (PP); Polystyrene (PS); Polyethylene terephthalate (PET or PETE); Polyamide (PA); Polyester Polyvinyl chloride (PVC); Polycarbonate (PC); Acrylonitrile butadiene styrene (ABS); Polyvinylidene chloride (PVDC); Polytetrafluoroethylene (PTFE); Polymethyl methacrylate (PMMA); Polylactic acid (PLA) may be modified, substituted or altered by the skilled artisan.

In addition, the polymer may be made from one or more monomers selected from: methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, glycidyl acrylate, 2-hydroxyethyl acrylate, hydroxypropyl acrylate (all isomers), hydroxybutyl acrylate (all isomers), diethylaminoethyl acrylate, triethyleneglycol acrylate, N-tert-butyl acrylamide, N-n-butyl acrylamide, N-methyl-ol acrylamide, N-ethyl-ol acrylamide, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, styrene, diethylamino styrene, para-methylstyrene, vinyl benzoic acid, vinyl benzene sulfonic acid, vinyl propionate, vinyl butyrate, vinyl benzoate, vinyl chloride, vinyl fluoride, vinyl bromide, methyl methacrylate, ethyl methacrylate, propyl methacrylate, butyl methacrylate, 2-ethylhexyl methacrylate, isobornyl methacrylate, methacrylic acid, benzyl methacrylate, phenyl methacrylate, methacrylonitrile, alpha methyl styrene, trimethoxysilylpropyl methacrylate, triethoxysilylpropyl methacrylate, tributoxysilylpropyl methacrylate, dimethoxymethylsilylpropyl methacrylate, diethoxymethylsilylpropylmethacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, isopropenyl butyrate, isopropenyl acetate, isopropenyl benzoate, isopropenyl chloride, isopropenyl fluoride, isopropenyl bromideitaconic aciditaconic anhydridedimethyl itaconate, methyl itaconate N-tert-butyl methacrylamide, N-n-butyl methacrylamide, N-methyl-ol methacrylamide, N-ethyl-ol methacrylamide, isopropenylbenzoic acid, diethylamino alphamethylstyrene, para-methyl-alpha-methylstyrene, diisopropenylbenzene, isopropenylbenzene sulfonic acid, methyl 2-hydroxymethylacrylate, ethyl 2-hydroxymethylacrylate, propyl 2-hydroxymethylacrylate, butyl 2-hydroxymethylacrylate, 2-ethylhexyl 2-hydroxymethylacrylate, isobornyl 2-hydroxymethylacrylate, and dimethyl Meta-Isopropenyl-benzyl Isocyanate. In some embodiments, the polymer may be inpart or entirely made from poly(1-phenyl-2-[p-trimethylsilylphenyl]acetylene, poly(1-trimethylsilyl-1-propyne), poly(ethylene octene), crosslinked poly(ethylene oxide), and 1,2-polybutadiene.

The polymers of the present invention may be modified and/or substituted with one or more halogens, hydroxyl groups, lower alkyl groups, lower alkoxy groups, monocyclic aryl, lower acyl groups and combinations thereof. Furthermore, one or more functional groups for the polymer may be chosen from ROOH, ROSH, RSSH, OH, $SO_3H$, $SO_3R$, $SO_4R$, COOH, $NH_2$, NHR, $NR_2$, $CONH_2$, and $NH-NH_2$, wherein R denotes, e.g., linear or branched hydrocarbon-based chains, capable of forming at least one carbon-based ring, being saturated or unsaturated; alkylenes, siloxanes, silanes, ethers, polyethers, thioethers, silylenes, and silazanes.

The polymers may include rubbery polymers, stiff chain polymers, glassy polymers and combinations thereof including: poly(1-phenyl-2-[p-trimethylsilylphenyl]acetylene (hereafter referred to as "PTMSDPA") and poly(1-trimethylsilyl-1-propyne) (hereafter referred to as "PTMSP") and elastomeric and rubbery polymers including poly(ethylene octene). Other polymers suitable for the present invention can be substituted or unsubstituted polymers and may include polysulfone, copolymer of styrene and acrylonitrile poly (arylene oxide), polycarbonate, and cellulose acetate, polysulfones; poly(styrenes), including styrene-containing copolymers such as acrylonitrilestyrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly (acrylates), poly(phenylene terephthalate), etc.; polysulfides; polymers from monomers having alpha-olefinic unsaturation other than mentioned above such as poly(ethylene), poly (propylene), poly(butene-1), poly(4-methyl pentene-1), polyvinyls, e.g., poly(vinyl chloride), poly(vinyl fluoride), poly(vinylidene chloride), poly(vinylidene fluoride), poly (vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly (vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; etc., and interpolymers, including block interpolymers having repeating units from the above such as terpolymers of acrylonitrile-vinyl bromide-sodium salt of para-sulfophenylmethallyl ethers; and grafts and blends having any of the foregoing. Substituents providing substituted polymers include halogens such as fluorine, chlorine and bromine; hydroxyl groups; lower alkyl groups; lower alkoxy groups; monocyclic aryl; lower acyl groups and the like.

The present invention includes the use of phenethylamine and modified and substituted phenethylamine monomers. The present invention provides the polymerization of various monomers, polymers and/or co-monomer combinations. For example, monomers may include a single monomer or a combination of 2 or more monomers including phenethylamine, 3-trifluoromethylphenethylamine, 2-chlorophenethylamine, 3-chlorophenethylamine, 4-chlorophenethylamine, 2,4-dichlorophenethylamine, 3-bromophenethylamine, 4-iodophenethylamine, 3-hydroxyphenethylamine, 4-hydroxyphenethylamine, 2,4-dihydroxyphenethylamine, 2-methylphenethylamine, 3-methylphenethylamine, 4-methylphenethylamine, 2,4-dimethylphenethylamine, 2,4,6-trimethylphenethylamine, 3-ethylphenethylamine, 4-ethylphenethylamine, 4-hexylphenethylamine, 3-nitrophenethylamine, 2-aminophenethylamine, 4-aminophenethylamine, 2,4-diaminophenethylamine, 2-methoxyphenethylamine, 3-methoxyphenethylamine, 4-methoxyphenethylamine, 2,4-dimethoxyphenethylamine, 2,4,6-trimethoxyphenethylamine, 3,4-dimethoxyphenethylamine, 2-ethoxyphenethylamine, 3-ethoxyphenethylamine, 4-ethoxyphenethylamine, 3-propoxyphenethylamine, 4-butoxyphenethylamine, 4-t-butoxyphenethylamine, 3-methoxymethylphenethylamine, 4-methoxymethylphenethylamine, 3-(2-methoxyethyl)phenethylamine, 4-(2-methoxyethyl)phenethylamine, 4-(2-hydroxyethyl)phenethylamine, 4-(3-hydroxypropyl)phenethylamine, 4-(2-hydroxyethoxy)phenethylamine, 4-phenylphenethylamine, 4-(2-chlorophenyl)phenethylamine, 4-(2-aminophenyl)phenethylamine, 3-(2,4,6-trimethylphenyl)phenethylamine, 4-phenoxyphenethylamine, 4-(3-chlorophenoxy)phenethylamine, 4-(4-aminophenoxy)phenethylamine, 3-benzylphenethylamine, 4-phenethylphenethylamine, 3-acetylphenethylamine, 4-acetylphenethylamine, 4-(2-phenoxyethyl)phenethylamine, and 3-benzyloxyphenethylamine for phenethylamine, 4-fluorophenethylamine, 3-hydroxyphenethylamine, 2,5-dihydroxyphenethylamine, 2-methylphenethylamine, 3-methylphenethylamine, 4-methylphenethylamine, 2,4-dimethylphenethylamine, 2,4,6-trimethylphenethylamine, 3-ethylphenethylamine, 4-ethylphenethylamine, 4-hexylphenethylamine, 3-nitrophenethylamine, 2-aminophenethylamine, 4-aminophenethylamine, 2,4-diaminophenethylamine, 2-methoxyphenethylamine, 2,5-dimethoxyphenethylamine, 2,3-dimethoxyphenethylamine, 3,5-dimethoxyphenethylamine, 3,4,5-trimethoxyphenethylamine, 3-methoxyphenethylamine, 4-methoxyphenethylamine, 2,4-dimethoxyphenethylamine, 2,4,6-trimethoxyphenethylamine, 3,4-dimethoxyphenethylamine, 2-ethoxyphenethylamine, 3-ethoxyphenethylamine, 4-ethoxyphenethylamine, 3-propoxyphenethylamine, 4-butoxyphenethylamine, 4-t-butoxyphenethylamine, 3-methoxymethylphenethylamine, 4-methoxymethylphenethylamine, 3-methoxyethylphenethylamine, 4-methoxyethylphenethylamine, 4-hydroxyethylphenethylamine, 4-hydroxypropylphenethylamine, 4-hydroxyethoxyphenethylamine, 4-phenylphenethylamine, 4-(2-chlorophenyl)phenethylamine, 4-(2-aminophenyl)phenethylamine, 3-(2,4,6-trimethylphenyl)phenethylamine, 4-phenoxyphenethylamine, 4-(3-chlorophenoxy)phenethylamine, 3,4-methylenedioxyphenethylamine, 6-methoxy-3,4-methylenedioxyphenethylamine, 2-methoxy-3,4-methylenedioxyphenethylamine, 4,5-methylenedioxyphenethylamine, 3-methoxy-4,5-methylenedioxyphenethylamine, 4-(4-aminophenoxy)phenethylamine, 3-benzylphenethylamine, 4-phenethylphenethylamine, 3-acetylphenethylamine, 4-acetylphenethylamine, 4-(2-phenoxyethyl)phenethylamine, and 3-benzyloxyphenethylamine for 4-hydroxyphenethylamine, and substitution and modifications thereof.

Other examples include β-Phenylethylamine (2-Phenylethylamine), Phenethylamine, 4-hydroxy-phenethylamine, 3,4-dihydroxy-phenethylamine, β,3,4-trihydroxy-N-methylphenethylamine, β,3,4-trihydroxyphenethylamine, β,3-dihydroxy-N-methylphenethylamine, 2,4,5-trihydroxyphenethylamine, β,4-dihydroxy-3-hydroxymethyl-N-tert-butyl-phenethylamine, α-methyl-3-acetylphenethylamine, β-ketoamphetamine, N-methyl-β-ketoamphetamine, 3-chloro-N-tert-butyl-β-ketoamphetamine, 3-trifluoromethyl-N-ethylamphetamine, 3,4,5-trimethoxyphenethylamine, 3,4-methylenedioxyamphetamine, 3,4-methylenedioxy-N-methylamphetamine, 3,4-methylenedioxy-N-methyl-β-ketoamphetamine, 2,5-dimethoxy-4-methylamphetamine, 2,5-dimethoxy-4-bromoamphetamine, 2,5-dimethoxy-4-nitroamphetamine, 2,5-dimethoxy-4-bromophenethylamine, 2,5-dimethoxy-4-chlorophenethylamine, 2,5-dimethoxy-4-iodoamphetamine, 2,5-dimethoxy-4-iodophenethylamine, 2,5-dimethoxy-4-methylphenethylamine, 2,5-dimethoxy-4-ethylphenethylamine, 2,5-dimethoxy-4-fluorophenethylamine, 2,5-dimethoxy-4-nitrophenethylamine, 2,5-dimethoxy-4-ethylthiophenethylamine, 2,5-dimethoxy-4-isopropylthiophenethylamine, 2,5-dimethoxy-4-propylthiophenethylamine, 2,5-dimethoxy-4-cyclopropylmethylthiophenethylamine, 5-dimethoxy-4-tert-butylthiophenethylamine, and 2,5-dimethoxy-4-(2-fluoroethylthio)-phenethylamine. Tyramine, Dopamine, Epinephrine (Adrenaline), orepinephrine (Noradrenaline), Phenylephrine, 6-Hydroxydopamine, Salbutamol, Acetylamphetamine, Cathinone, Methcathinone, Bupropion, Fenfluramine, Mescaline, MDA, MDMA, MDMC, DOM, DOB, DON, 2C-B, 2C-C, DOI, 2C-T, 2C-D, 2C-E, 2C-F, 2C-N, 2C-T-2, 2C-T-4, 2C-T-7, 2C-T-8, 2C-T-9, and 2C-T-21.

In addition, the polymers, monomers or copolymer may be modified by the addition or substitution of one or more of the following groups: lower alkyl, alkenyl, amino, aryl, alkylaryl, halogen, halo, haloalkyl, phosphoryl or combination thereof. In addition, the modification may be similarly modified with one or more lower alkyl, alkenyl, amino, aryl, alkylaryl, halogen, halo, haloalkyl, phosphoryl or combination thereof.

In addition, the polymers, monomers or copolymer may include monomers that are hydrophilic and/or hydrophobic and may be cross-linked to form polymer films and/or membranes. The skilled artisan will recognize that by varying the degree of cross-linking of the polymers, the polymers can have very high concentrations of ionic groups (i.e., sulfonic acid) without a high water uptake. In addition, the present invention may include sulfonated polymer structures and substrates. For example, current sulfonated polymer membranes for reverse osmosis applications display stability over a pH range of about 4 to about 11, with a high water flux and high chlorine tolerance.

Conventional water purification membranes can be purchased in spiral-wound modules, hollow fiber modules, and flat sheets, which are described elsewhere. Polydopamine has a large advantage over other conventional surface modification techniques, as the surface modification can be performed on the membranes after they have been processed into module form. Almost all other membrane modifications have to be performed before they are placed in modules. To coat polydopamine and similar adherent polymers to commercial membranes on a large scale, a slightly modified water purification crossflow system will be employed. FIG. 7 shows a picture and schematic of a laboratory-scale crossflow system. In this system, feed water is pumped through a series of membrane cells at high transmembrane pressure. A percentage of the feed water contacts the membrane surface, where any contaminants are theoretically rejected by the membrane, allowing pure water to pass through the membrane and be collected for beneficial use. Any feed water that does not pass through the membrane is returned to the feed tank for future filtration.

To coat spiral-wound membranes, hollow fiber membranes, and flat sheet membranes with polydopamine, a standard crossflow system described above will be modified in three ways: 1.) the permeate side of the membrane module will be initially blocked, thereby eliminating any dopamine solution transmission through the membrane. The blockage, such as a rubber stopper or a clamp, can be removed after dopamine treatment. 2.) A particle filter will be placed in-line near the inlet of each membrane module to remove any microparticles that form during the polydopamine formation. Alkaline dopamine solutions will form microparticles that could impede water flow through the feed-side of membrane modules if they are not removed from the feed stream. Therefore, these particles should be removed before the solution is introduced into the module. The particle filter nominal pore diameter should be in between 0.05 microns and 20 microns, with a preferable nominal pore diameter of approximately 5 microns. 3.) A small pump will be used in place of the high-powered pump used to achieve high transmembrane pressures. The small pump should be capable of operating at low pressures (0-50 psig, with a preferable pressure range in between 0-10 psig) and flowrates that keep the residence time of the dopamine solution in each module in between 0 seconds and 3 hours, with a preferable residence time in between 0 seconds and 10 minutes. The small residence time will ensure that no microparticles are formed in the membrane module. Residence time is defined as the total feed-side volume of a membrane module divided by the volumetric flowrate of the feed-side dopamine solution. As membrane modules could be added to the modified crossflow system in series, numerous modules, anywhere from 0-100000000, could be polydopamine-treated at once. A schematic of the modified crossflow system is shown in FIG. 8.

In addition, the polymers may be made into a membrane for separations, films, sheets, tubes, rolls, hollow filaments, or fibers objects of a specific shape. In addition, polymers having a porous separation membrane, or substrate, and a coating in occluding contact with the porous separation membrane are also contemplated.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A method of decreasing membrane fouling comprising the steps of:
   depositing dopamine on a membrane to form a polydopamine coated membrane, wherein the polydopamine coated membrane has a higher water flux and a higher fouling resistance and an increased membrane surface hydrophilicity than an unmodified membrane.

2. The method of claim 1, wherein the pure water flux of the polydopamine coated membrane comprises between 50 and 150% of the flux of the unmodified membrane.

3. The method of claim 1, wherein filtration results in the water flux of the polydopamine coated membrane comprises about between 75 and 200% of the flux of the unmodified membrane.

4. The method of claim 1, wherein the dopamine comprises one or more substitutions selected from the addition of halogens, hydroxyl groups, lower alkyl groups, lower alkoxy groups, monocyclic aryl, lower acyl groups and combinations thereof.

5. The method of claim 1, wherein the membrane comprises a RO membrane, a UF membrane, a NF membrane, an MF membrane or a combination thereof.

6. The method of claim 1, wherein the polydopamine coated membrane comprises one or more of the following polymethylmethacrylates, polystyrenes, polycarbonates, polyimides, epoxy resins, cyclic olefin copolymers, cyclic olefin polymers, acrylate polymers, polyethylene teraphthalate, polyphenylene vinylene, polyether ether ketone, poly (N-vinylcarbazole), acrylonitrile-styrene copolymer, or polyetherimide poly(phenylenevinylene).

7. The method of claim 1, wherein the dopamine comprises one or more functional groups chosen from ROOH, ROSH, RSSH, OH, SO3H, SO3R, SO4R, COOH, NH2, NHR, NR2, CONH2, and NH—NH2, wherein R denotes: linear or branched hydrocarbon-based chains, capable of forming at least one carbon-based ring, being saturated or unsaturated; alkylenes, siloxanes, silanes, ethers, polyethers, thioethers, silylenes, and silazanes.

8. The method of claim 1, wherein the polydopamine coated membrane comprises one or more polysulfone, copolymer of styrene and acrylonitrile poly(arylene oxide), polycarbonate, cellulose acetate, polysulfones; poly(styrenes), styrene-containing copolymers, acrylonitrilestyrene copolymers, styrene-butadiene copolymers, styrene-vinylbenzylhalide copolymers; polycarbonates; cellulosic polymers, cellulose acetate-butyrate, cellulose propionate, ethyl cellulose, methyl cellulose, nitrocellulose, polyamides, polyimides, aryl polyamides, aryl polyimides, polyethers, poly(arylene oxides), poly(phenylene oxide), poly(xylene oxide); poly(esteramide-diisocyanate), polyurethanes, polyesters (including polyarylates), poly(ethylene terephthalate), poly(alkyl methacrylates), poly(acrylates), poly(phenylene terephthalate), polysulfides, poly (ethylene), poly(propylene), poly(butene-1), poly(4-methyl pentene-1), polyvinyls, poly(vinyl chloride), poly(vinyl fluoride), poly(vinylidene chloride), poly(vinylidene fluoride), poly(vinyl alcohol), poly(vinyl esters), poly(vinyl acetate), poly(vinyl propionate), poly(vinyl pyridines), poly(vinyl pyrrolidones), poly(vinyl ethers), poly(vinyl ketones), poly(vinyl aldehydes), poly(vinyl formal), poly(vinyl butyral), poly(vinyl amides), poly(vinyl amines), poly(vinyl urethanes), poly(vinyl ureas), poly(vinyl phosphates), poly(vinyl sulfates), polyallyls; poly(benzobenzimidazole), polyhydrazides, polyoxadiazoles, polytriazoles, poly (benzimidazole), polycarbodiimides, polyphosphazines and combinations thereof.

9. The method of claim 1, further comprising the step of applying one or more second coatings to the polydopamine coated membrane.

10. The method of claim 9, further comprising the step of applying one or more second coatings to the polydopamine coated membrane, wherein the one or more second coatings are polyethylene glycol (PEG) using polydopamine as an adhesion layer.

11. The method of claim 1, further comprising the step of applying one or more hydrophilic coatings to the polydopamine coated membrane.

12. A liquid separation apparatus comprising:
a purification membrane;
a polydopamine layer deposited on the purification membrane to form a polydopamine coated membrane, wherein the polydopamine layer increases the hydrophilicity of the purification membrane and the polydopamine coated membrane has a high water flux; and
one or more containers positioned on different sides of the polydopamine coated membrane to contain the separated liquid.

13. A purification membrane comprising:
a hydrophobic purification membrane;
a polydopamine layer in contact with the hydrophobic purification membrane to form a polydopamine coated hydrophobic purification membrane with a high water flux and a high hydrophilicity than an unmodified hydrophobic membrane; and
a hydrophilic coating in contact with the polydopamine layer to form a multi layer hydrophobic-polydopamine-hydrophilic purification membrane.

14. A purification membrane comprising:
a polymer matrix purification membrane; and
one or more monomers comprising an aromatic dihydroxy and an amine deposited on the purification membrane to form an aromatic dihydroxy and amine-coated purification membrane; and
a polydopamine layer in contact with the dihydroxy and amine-coated purification membrane to form a polydopamine coated purification membrane with a higher water flux and a higher hydrophilicity than an unmodified dihydroxy and amine-coated purification membrane.

15. A purification membrane comprising:
a polymer matrix purification membrane; and
a polydopamine layer deposited on the purification membrane to form a polydopamine coated purification membrane with a high water flux and a high hydrophilicity than an unmodified membrane.

16. A polydopamine coated purification membrane system for modification of conventional purification membranes comprising:
a dopamine solution disposed in a feed tank;
a pump connected to the feed tank to move the dopamine solution;
a membrane inlet connection to connect the pump to a membrane to allow the polydopamine to be deposited on the membrane; and
a membrane outlet connection to connect the membrane to the feed tank to return the dopamine solution to the feed tank.

* * * * *